(12) United States Patent
Durrant et al.

(10) Patent No.: US 12,474,240 B2
(45) Date of Patent: Nov. 18, 2025

(54) STABILIZED TWO-PART HEMATOXYLIN SOLUTION UTILIZING pH ADJUSTMENT

(71) Applicant: Ventana Medical Systems, Inc., Tucson, AZ (US)

(72) Inventors: Edward E. Durrant, Oro Valley, AZ (US); Christopher A. Koerber, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 65 days.

(21) Appl. No.: 17/540,450

(22) Filed: Dec. 2, 2021

(65) Prior Publication Data

US 2022/0090993 A1  Mar. 24, 2022

Related U.S. Application Data

(60) Division of application No. 16/653,440, filed on Oct. 15, 2019, now abandoned, which is a continuation of application No. PCT/EP2018/061757, filed on May 8, 2018.

(60) Provisional application No. 62/504,066, filed on May 10, 2017.

(51) Int. Cl.
| | | |
|---|---|---|
| *G01N 1/30* | (2006.01) | |
| *C09B 65/00* | (2006.01) | |
| *C09B 67/10* | (2006.01) | |
| *C09B 67/14* | (2006.01) | |
| *C01D 1/00* | (2006.01) | |

(52) U.S. Cl.
CPC .............. *G01N 1/30* (2013.01); *C09B 65/00* (2013.01); *C09B 67/0014* (2013.01); *C09B 67/0017* (2013.01); *C01D 1/00* (2013.01); *G01N 2001/302* (2013.01); *Y10S 436/826* (2013.01)

(58) Field of Classification Search
None
See application file for complete search history.

(56) References Cited

U.S. PATENT DOCUMENTS

| | | | |
|---|---|---|---|
| 8,263,361 B2 * | 9/2012 | Kosmeder | G01N 1/30 435/40.52 |
| 10,830,675 B2 | 11/2020 | Barnett et al. | |
| 2013/0302852 A1 | 11/2013 | Barnes et al. | |
| 2017/0315031 A1 * | 11/2017 | Budak | C07D 311/30 |

FOREIGN PATENT DOCUMENTS

| | | | |
|---|---|---|---|
| CN | 101125846 A | 2/2008 | |
| CN | 103415762 A | 11/2013 | |
| CN | 103694732 | 4/2014 | |
| CN | 106461517 A | 2/2017 | |
| JP | 2005-526064 A | 9/2005 | |
| JP | 2010521678 A | 6/2010 | |
| WO | 030/075915 A1 | 9/2003 | |
| WO | 2008/112993 A1 | 9/2008 | |
| WO | WO-2009148885 A2 * | 12/2009 | .............. G01N 1/30 |
| WO | 2012096842 A1 | 7/2012 | |
| WO | 2013112891 A1 | 8/2013 | |
| WO | 2015165850 A1 | 11/2015 | |
| WO | 2016064353 A1 | 4/2016 | |
| WO | 2016096943 A1 | 6/2016 | |
| WO | 2016170008 A1 | 10/2016 | |
| WO | 2016188771 A1 | 12/2016 | |

OTHER PUBLICATIONS

Office Action issued Jul. 15, 2021 for CA3062732.
International Search Report for PCT/EP2018/061757, dated Oct. 10, 2018.

* cited by examiner

*Primary Examiner* — Nghi V Nguyen
(74) *Attorney, Agent, or Firm* — Charney IP Law LLC; Thomas M. Finetti

(57) ABSTRACT

The present disclosure provides stabilized hematoxylin formulations having a pH of less than 2.4. In general, the stabilized hematoxylin formulations comprise a solvent, a hematoxylin dye, and an acid. The present disclosure also provides methods of using such stabilized hematoxylin formulations to stain biological samples. The present disclosure also provides for methods of readjusting the pH of a stabilized hematoxylin formulation to provide a hematoxylin staining solution.

17 Claims, 4 Drawing Sheets
(4 of 4 Drawing Sheet(s) Filed in Color)

STABILIZED TWO-PART HEMATOXYLIN SOLUTION UTILIZING pH ADJUSTMENT

CROSS REFERENCE TO RELATED APPLICATIONS

The present application is a divisional of U.S. patent application Ser. No. 16/653,440, filed on Oct. 15, 2019, which application is a continuation of International Application No. PCT/EP2018/061757 filed on May 8, 2018, which application claims the benefit of the filing date of U.S. Provisional Patent Application No. 62/504,066 filed May 10, 2017, the disclosures of which are each hereby incorporated herein by reference in their entireties.

BACKGROUND OF THE DISCLOSURE

Compositions comprising hematoxylin and hematein are commonly used in pathology (the microscopic examination of fixed cytology specimens, i.e. individual cells in a smear or cell block) and histology (microscopic examination of cell aggregates that form a structure with a specific function). For example, hematoxylin and hematein are often used to stain cell nuclei prior to microscopic examination.

Staining makes normally transparent cells colored, which facilitates analysis. Hematoxylin staining can be accomplished either manually using an immersion (dip and dunk) technique or by using automated systems, such as the Symphony® automated system provided by Ventana Medical Systems, Inc. The staining processes generally involve: (a) removing paraffin from a specimen affixed to a microscope slide and hydrating the specimen by soaking in water; (b) applying hematoxylin to stain cell nuclei; (c) removing excess hematoxylin by rinsing with water; (d) contacting the slide with a concentrated solution having a pH above 5.0 to turn the hematoxylin blue (e.g. a bluing solution); and (e) removing the bluing solution by rinsing with water.

BRIEF SUMMARY OF THE DISCLOSURE

In one aspect of the present disclosure is a stabilized hematoxylin formulation having a pH of less than 2.4. In some embodiments, the stabilized hematoxylin formulation has a pH of less than 2.3. In some embodiments, the stabilized hematoxylin formulation has a pH of less than 2.2. In some embodiments, the stabilized hematoxylin formulation has a pH of between about 2.1 and about 2.2. In some embodiments, the stabilized hematoxylin formulation remains free of precipitates for a period of at least thirty days. In some embodiments, the stabilized hematoxylin formulation remains free of precipitates for a period of at least sixty days. In some embodiments, the stabilized hematoxylin formulation may be treated with a readjustment solution to provide a hematoxylin solution suitable for staining a tissue sample.

In another aspect of the present disclosure is a stabilized hematoxylin formulation comprising a solvent, hematoxylin dye and an acid (e.g. a strong acid), wherein the acid is present within the stabilized hematoxylin formulation in an amount ranging from between about 0.05% to about 10% by total volume of the stabilized hematoxylin formulation, and wherein the stabilized hematoxylin formulation has a pH of less than 2.4. In some embodiments, the pH of the stabilized hematoxylin formulation is less than 2.3. In some embodiments, the pH of the stabilized hematoxylin formulation is less than 2.2. In some embodiments, the stabilized hematoxylin formulation has a pH of between about 2.1 and about 2.2. In some embodiments, the acid is selected from the group consist of hydrochloric acid, sulfuric acid, perchloric acid and nitric acid.

In some embodiments, the stabilized hematoxylin formulation further comprises a mordant and an oxidant. In some embodiments, the oxidant is sodium iodate; and the mordant comprises aluminum. In some embodiments, the stabilized hematoxylin formulation further comprises a shelf-life extending agent. In some embodiments, the shelf-life extending agent is a polyol. In some embodiments, the formulation consists essentially of hematoxylin dye, a mordant, an oxidant, and the acid.

In some embodiments, the stabilized hematoxylin formulation remains free of precipitates for a period of at least thirty days. In some embodiments, the stabilized hematoxylin formulation remains free of precipitates for a period of at least sixty days.

In another aspect of the present disclosure is a method of forming a stabilized hematoxylin formulation comprising reducing the pH of a starting hematoxylin staining composition (e.g. one including hematoxylin dye and optionally a mordant) to a pH of less than 2.4, wherein the pH is reduced by adding an acid to the hematoxylin staining composition. In some embodiments, the pH is reduced by introducing 1M hydrochloric acid to the hematoxylin staining solution. In some embodiments, the pH is reducing using 0.5M sulfuric acid. In some embodiments, the pH of the stabilized hematoxylin formulation ranges from between 2.1 to about 2.3. In some embodiments, the pH of the stabilized hematoxylin formulation ranges from between 2.1 to about 2.25.

In another aspect of the present disclosure is a method of readjusting the pH of a stabilized hematoxylin formulation (such as a stabilized hematoxylin formulation having a pH of less than 2.4) to provide a hematoxylin staining solution, wherein the pH is readjusted by adding one of a strong base or a buffer to the stabilized hematoxylin formulation until the pH increases to at least 2.4. In some embodiments, a pre-formulated strong base or a pre-formulated buffer is titrated into the stabilized hematoxylin formulation until a predetermined pH is reached. In some embodiments, the predetermined pH is one which is suitable for staining a biological sample (e.g. a pH greater than 2.4; a pH of between 2.4 and 2.7; a pH of between 2.4 and 2.6, etc.). In some embodiments, the predetermined pH ranges from between about 2.4 to about 2.6. In some embodiments, the predetermined pH ranges from between about 2.45 to about 2.6. In some embodiments, the predetermined pH ranges from between about 2.5 to about 2.6. In some embodiments, the predetermined pH ranges from between about 2.55 to about 2.6. In some embodiments, the method of readjustment further comprises adding additional mordant or oxidant to the resulting hematoxylin staining solution.

In another aspect of the present disclosure is a method of staining a biological sample comprising: (i) increasing the pH of a stabilized hematoxylin formulation to provide a hematoxylin staining solution having a pH suitable for staining; and (ii) applying the hematoxylin staining solution to a biological sample. In some embodiments, the pH suitable for staining ranges from 2.4 to about 2.6. In some embodiments, the pH suitable for staining ranges from 2.5 to about 2.6. In some embodiments, the pH of the stabilized hematoxylin formulation is increased by titrating into the formulation a predetermined quantity of a strong base. In some embodiments, the pH of the stabilized hematoxylin formulation is increased by titrating into the formulation a predetermined quantity of a buffer.

In another aspect of the present disclosure is a kit comprising first and second components, the first component comprising a stabilized hematoxylin formulation having a pH of less than 2.4; and the second component comprising a readjustment solution. In some embodiments, the readjustment solution is comparatively basic relative to the stabilized hematoxylin formulation. In some embodiment, the kit further comprises instructions for mixing the first and second components to provide a hematoxylin staining solution having a pH of greater than 2.4. In some embodiments, the instructions describe a specific amount of the second component to add to the first component to provide a hematoxylin staining solution having a predetermined pH. In some embodiments, the first and second components are each housed in a separate container. In some embodiments, the first and second components are provided in separate fluid dispensers, each fluid dispenser suitable for use in an automated staining apparatus, such as disclosed herein.

In another aspect of the present disclosure is a kit comprising a first component and a second component, the first component comprising a stabilized hematoxylin formulation comprising a hematoxylin dye and an acid in an amount ranging from about 0.2% to about 4% by total volume of the stabilized hematoxylin formulation, and wherein the stabilized hematoxylin formulation has a pH of less than 2.4; and the second component comprising a strong base or a buffer, the second component provided in an amount relative to the first component such that when the first and second components are mixed, the pH of the resulting hematoxylin staining solution increases to greater than 2.4. In some embodiments, an amount of second component is provided such that the pH increases to at least 2.5.

In another aspect of the present disclosure is a system for staining a biological sample (such as one mounted on a substrate, e.g. a microscope slide) comprising: a first container comprising a stabilized hematoxylin formulation comprising hematoxylin dye and an acid in an amount ranging from about 0.1% to about 6% by total volume of the stabilized hematoxylin formulation, and wherein the stabilized hematoxylin formulation has a pH of less than 2.4; a second container comprising a readjustment solution, the first and second containers fluidically connected (such as through a mixing receptacle) such that the stabilized hematoxylin formulation and the readjustment solution can be combined to provide a hematoxylin staining solution having a pH of greater than 2.4. In some embodiments, the pH of the resulting hematoxylin staining solution is greater than 2.45. In some embodiments, the pH of the resulting hematoxylin staining solution is greater than 2.5.

Standard hematein staining procedures utilize a premixed stock containing both the hematoxylin-hematein and a mordant. Precipitates often form in these premixed stocks. This is generally not a problem for manual staining procedures, where slides are treated with the hematoxylin staining solution in a container, such as a glass container. However, precipitates may be a problem for automated staining systems where the precipitate can foul or clog delivery lines and make cleaning or purging of the delivery lines difficult. These changes to hematoxylin and the precipitates in staining solutions can result in staining inconsistencies. For example, hematoxylin stain stocks containing mordant are often allowed to ripen for an extended period of time, allowing developing of hematein-mordant complexes. While this process may allow for good staining results, it also results in the formation of the undesirable precipitate. Hematein precipitate buildup on surfaces of tubing, valves, dispense manifolds, etc. can have impacts ranging from on-slide precipitate to interference or occlusion of hematoxylin dispense. Precipitation is also exacerbated by contact with metal. This is especially problematic for automated systems which contain metal parts such as nozzles and spray heads with very small diameter openings which can be clogged by precipitates. In the case of on-the-slide precipitate, the impact can be as low as being a nuisance for the pathologist reading the slide, to as high as impacting diagnostic utility. Substantial buildup of precipitate in the staining module can require the replacement of parts, or in the worst case, replacement of an entire staining module to remediate this issue. The skilled artisan will also appreciate that any hematoxylin precipitate could impact the diagnostic utility of the stain.

Applicants have developed a two-part hematoxylin stain composition that allows for long term storage of the stabilized hematoxylin formulation without substantial formation of precipitate. Indeed, Applicants have demonstrated that by initially formulating the hematoxylin staining solution at a low pH (e.g. a pH less than about 2.4), it is possible to provide a stable hematoxylin formulation that does not readily precipitate. Applicants have surprisingly discovered that at this low pH, the solution can be stored and remain stable for weeks or even months. Applicants further submit that the proposed stabilized hematoxylin formulations are able to be readily used in any diagnostic application without complicated chemical transformations. In fact, at the time the solution is to be used to stain tissue, the stabilized hematoxylin formulations disclosed herein may be mixed with a pre-formulated readjustment solution that restores the pH of the stabilized hematoxylin formulation to a level that is suitable for staining (e.g. a pH ranging from between about 2.45 and about 2.6). These and other unexpectedly superior results will be described further herein.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Overview

Figure 1:
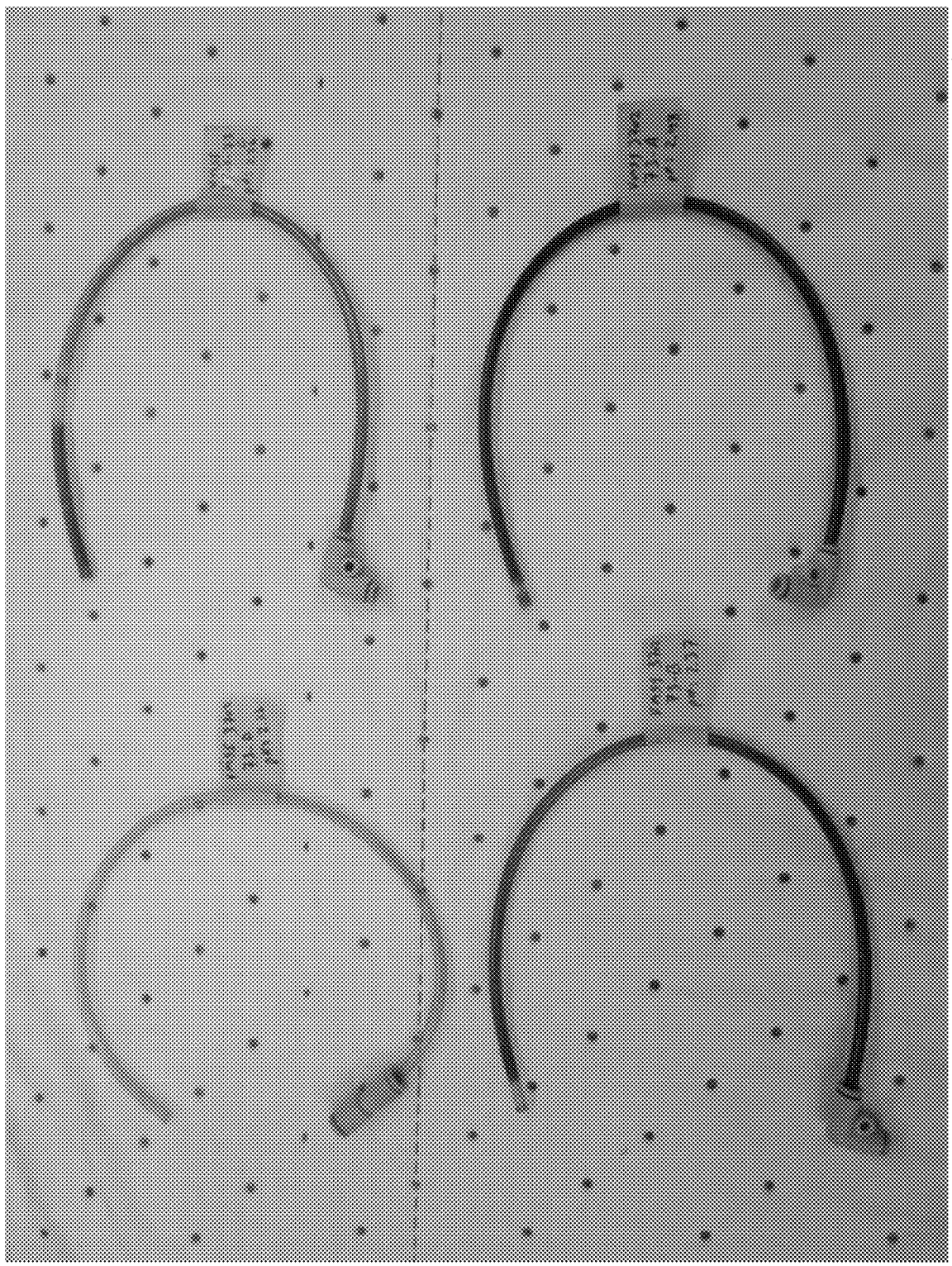
FIG. 1 illustrates four tubes comprising stabilized hematoxylin formulations having pHs of 2.16, 2.26, 2.37, and 2.48 (pH reduced using hydrochloric acid). At seven days of incubation at 60° C., the tubing having a pH of 2.16 and 2.26 showed the least amount of precipitate.

The present disclosure provides methods and compositions for mitigating or preventing the build-up of precipitates in hematoxylin staining solutions. As a result of the methods and compositions disclosed herein, hematoxylin storage containers, delivery lines, nozzles, fluid dispensers, and other reagent delivery components of an automated hematoxylin staining apparatus may remain substantially precipitate free.

In some embodiments, the present disclosure provides stabilized hematoxylin formulations which remain substantially precipitate-free for an extended period of time, e.g. for a period of time of 1-month, 2-months, 3-months, 6-months, 9-months, 12-months, or longer. Following storage, the present disclosure provides methods and compositions to facilitate the use of the stabilized hematoxylin formulations in an automated staining apparatus. Other aspects of the present disclosure relate to processes for staining biological samples, and in particular to automated processes for staining biological sample with a hematoxylin staining solution.

Definitions

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The term "biological sample" refers to any sample that is obtained from or otherwise derived from a biological entity such as an animal, for example, a sample obtained from a human or a veterinary animal such as a dog, cat, horse or cow. Examples of biological samples include cytology samples, tissue samples and biological fluids. Non-limiting particular examples of biological samples include blood, urine, pre-ejaculate, nipple aspirates, semen, milk, sputum, mucus, pleural fluid, pelvic fluid, sinovial fluid, ascites fluid, body cavity washes, eye brushings, skin scrapings, a buccal swab, a vaginal swab, a pap smear, a rectal swab, an aspirate, a needle biopsy, a section of tissue obtained for example by surgery or autopsy, plasma, serum, spinal fluid, lymph fluid, sweat, tears, saliva, tumors, organs and samples obtained from in vitro cell or tissue cultures. Typically, the sample will be a biopsy sample that has been fixed, processed to remove water and embedded in paraffin or another suitable waxy substance for cutting into tissue sections. Biological samples can be mounted on substrates such as microscope slides for treatment and/or examination.

The term "mordant" refers to an ionic metal species with which a dye (such as hematein) can form a complex (such as a cationic complex) that serves to bind the dye (such as hematein) to particular cellular components such as nuclear DNA, myelin, elastic and collagen fibers, muscle striations and mitochondria.

Stabilized Hematoxylin Formulations

The present disclosure provides stabilized hematoxylin formulations. In general, the stabilized hematoxylin formulations comprise a solvent, a hematoxylin dye, and an acid. In some embodiments, the stabilized hematoxylin formations comprise at least one of a mordant, an oxidant, a shelf-life extending agent, an anti-oxidant, and a stabilizer. Additional components suitable for use within any of the stabilized hematoxylin formulations of the present disclosure are set forth by Avwioro et al. "Histochemical Uses Of Hematoxylin—A Review," JPCS Vol (1), April-June 2011, and Bryan D Llewellyn, "Hematoxylin Formulae," http://stainsfile.info, October 2013, the disclosures of which are hereby incorporated by reference herein in their entireties. For example, the stabilized hematoxylin formulations may include a trapping agent (e.g. iodine).

In some embodiments, the stabilized hematoxylin formulation has a pH of less than 2.4. In some embodiments, the stabilized hematoxylin formulation has a pH of less than 2.375. In other embodiments, the stabilized hematoxylin formulation has a pH of less than 2.35. In other embodiments, the stabilized hematoxylin formulation has a pH of less than 2.325. In other embodiments, the stabilized hematoxylin formulation has a pH of less than 2.3. In other embodiments, the stabilized hematoxylin formulation has a pH of less than 2.275. In other embodiments, the stabilized hematoxylin formulation has a pH of less than 2.25. In other embodiments, the stabilized hematoxylin formulation has a pH of less than 2.225. In other embodiments, the stabilized hematoxylin formulation has a pH of less than 2.2. In other embodiments, the stabilized hematoxylin formulation has a pH of less than 2.175. In other embodiments, the stabilized hematoxylin formulation has a pH of less than 2.15. In other embodiments, the stabilized hematoxylin formulation has a pH of less than 2.125. In other embodiments, the stabilized hematoxylin formulation has a pH of less than 2.1.

In some embodiments, the stabilized hematoxylin formulation has a pH of between about 1.5 and about 2.4. In other embodiments, the stabilized hematoxylin formulation has a pH of between about 1.5 and about 2.3. In other embodiments, the stabilized hematoxylin formulation has a pH of between about 1.6 and about 2.3. In other embodiments, the stabilized hematoxylin formulation has a pH of between about 1.8 and about 2.3. In other embodiments, the stabilized hematoxylin formulation has a pH of between about 2 and about 2.3. In other embodiments, the stabilized hematoxylin formulation has a pH of between about 2 and about 2.3. In other embodiments, the stabilized hematoxylin formulation has a pH of between about 2 and about 2.2. In other embodiments, the stabilized hematoxylin formulation has a pH of between about 1.5 and about 2.2. In other embodiments, the stabilized hematoxylin formulation has a pH of between 1.6 and 2.2.

Any acid may be utilized in the stabilized hematoxylin formations. Non-limiting examples of suitable acids include hydroiodic acid, hydrobromic acid, hydrochloric acid, nitric acid, hydrofluoric acid, nitrous acid, and formic acid.

In some embodiments, the acid is a strong acid. In some embodiments, the strong acid is selected from hydrochloric acid, sulfuric acid, perchloric acid, nitric acid or mixtures thereof. In other embodiments, the strong acid is hydrochloric acid. In some embodiments, the strong acid is 1M hydrochloric acid. In other embodiments, the strong acid is 0.5M hydrochloric acid. In other embodiments, the strong acid is 0.5M sulfuric acid. In yet other embodiments, the strong acid is 0.25M sulfuric acid. Of course, the skilled artisan will be able to select any acid that allows for the composition to achieve a predetermined pH.

The skilled artisan will appreciate that the amount of acid in the formulation may vary depending, of course, on the particular acid selected, the molarity of the acid, the normality of the acid, and/or the presence of other components in the stabilized hematoxylin formulation. In some embodiments, the amount of acid in any stabilized hematoxylin formation ranges from about 0.05% to about 15% by total volume of the formulation. In other embodiments, the amount of acid in any stabilized hematoxylin formation ranges from about 0.05% to about 12% by total volume of the formulation. In yet other embodiments, the amount of acid in any stabilized hematoxylin formation ranges from about 0.1% to about 10% by total volume of the formulation. In yet other embodiments, the amount of acid in any stabilized hematoxylin formation ranges from about 0.1% to about 7.5% by total volume of the formulation. In yet other embodiments, the amount of acid in any stabilized hematoxylin formation ranges from about 0.1% to about 6% by total volume of the formulation. In yet other embodiments, the amount of acid in any stabilized hematoxylin formation ranges from about 0.1% to about 5% by total volume of the formulation. In yet other embodiments, the amount of acid in any stabilized hematoxylin formation ranges from about 0.1% to about 4% by total volume of the formulation. In yet other embodiments, the amount of acid in any stabilized hematoxylin formation ranges from about 0.2% to about 4% by total volume of the formulation.

In other embodiments, the amount of acid in any stabilized hematoxylin formation ranges from about 0.5% to about 12% by total volume of the formulation. In yet other embodiments, the amount of acid in any stabilized hematoxylin formation ranges from about 0.5% to about 10% by total volume of the formulation. In yet other embodiments, the amount of acid in any stabilized hematoxylin formation ranges from about 0.5% to about 7.5% by total volume of the formulation. In yet other embodiments, the amount of acid in any stabilized hematoxylin formation ranges from about 0.5% to about 6% by total volume of the formulation. In yet other embodiments, the amount of acid in any stabilized hematoxylin formation ranges from about 0.5% to about 5% by total volume of the formulation. In yet other embodiments, the amount of acid in any stabilized hematoxylin formation ranges from about 0.5% to about 4% by total volume of the formulation. In yet other embodiments, the amount of acid in any stabilized hematoxylin formation ranges from about 1% to about 4% by total volume of the formulation.

Various solvents can be utilized within the stabilized hematoxylin formulations. In some embodiments, the solvent includes one or more of water, a lower alkanol such as ethanol, and a polyol. In other embodiments, the solvent includes an aqueous solvent wherein the aqueous solvent comprises water and a polyol. Suitable examples of useful polyols include glycerol, ethylene glycol, propylene glycol, poly (ethylene glycol), and poly (propylene glycol). Aqueous solvent compositions typically will comprise 5-45% by volume of one or more of ethylene glycol and propylene glycol, and more typically 10-30% by volume of one or more of ethylene glycol and propylene glycol.

Suitable mordants for use in any stabilized hematoxylin formulation include an aluminum mordant, an iron mordant, a bismuth mordant, a copper mordant, a molybdenum mordant, a vanadium mordant, and a zirconium mordant. In some embodiments, the mordant comprises an alum. In other embodiments, the mordant comprises aluminum sulfate. In some embodiments, the mordant can be present in the composition at a concentration greater than the concentration of the hematein in the composition (determinable by refractometry, thin-layer chromatography or spectroscopy), or it can be present in the composition at a concentration less than the concentration of the hematein in the composition. Alternatively, in some embodiments, the molar ratio of hematoxylin to mordant in the composition is between 2:1 and 1:100. In other embodiments, the molar ratio of hematoxylin to mordant in the composition is between 1:5 and 1:20.

Suitable oxidants include naturally occurring molecular oxygen in the atmosphere that diffuses to and oxidizes hematoxylin and a "chemical oxidant" that is actively combined with hematoxylin (typically in solution) to convert at least a portion of the hematoxylin to hematein. Half-oxidized hematoxylin solutions are solutions in which the oxidant is included in an amount which oxidizes approximately one half of the available hematoxylin, as described by Gill, Acta Cytologica, 18(4):300-11 (1974), the disclosure of which is incorporated herein by reference in its entirety. Examples of useful chemical oxidants include one or more of an iodate salt (such as sodium iodate and potassium iodate), mercuric oxide, a permanganate salt (such as potassium permanganate), a periodate salt (such as sodium periodate and potassium periodate), and a peroxide (such as hydrogen peroxide). In particular embodiments, the chemical oxidant comprises sodium iodate.

The oxidant may be present in an amount sufficient to completely (such as substantially quantitatively) oxidize the hematoxylin to hematein, or sufficient only to partially oxidize the hematoxylin to hematein. In particular embodiments, more than half of the hematoxylin is oxidized to hematein by the chemical oxidant, and in others, less than half of the hematoxylin is oxidized to hematein by the chemical oxidant. For example, between 1% and 50% of the hematoxylin can be oxidized to hematein by the chemical oxidant, but more typically, between about 10% and about 30% of the hematoxylin is oxidized to hematein by the chemical oxidant. In particular examples, the molar ratio of hematoxylin to oxidant used in the composition is between 6:1 and 1:1. It should be understood that although the chemical oxidant is considered part of the composition, it is converted to its reduction products upon reaction with the hematoxylin, which reduction products will remain in the composition.

Examples of antioxidants suitable for use in any stabilized hematoxylin formulation include hydroquinones; gallic acid; reducible sugars such as sorbitol and mannitol; benzoates and hydroxybenzoates; sulfites and metabisulfites; certain acids such as citric acid, tartaric acid, lactic acid, erythorbic acid ascorbic acid, uric acid, tannic acid, and salts of such acids (such as Mg2+, NH4+, Na+, K+and Ca2+ salts).

Examples of stabilizers include, but are not limited to, amylose, a cyclodextrin, a cryptand, a cryptophane, a cavitand, a crown ether, a dendrimer, a nanotube, a calixarene, a valinomycin, and a nigericin.

In some embodiments, containers (including tubing, etc.) comprising a stabilized hematoxylin formulation according to the present disclosure are substantially precipitate free for a period of at least 1-month. In other embodiments, the containers are substantially precipitate free for a period of at least 3-months. In yet other embodiments, the containers are substantially precipitate free for a period of at least 6-months. In yet other embodiments, the containers are substantially precipitate free for a period of at least 12-months. In yet other embodiments, the containers are substantially precipitate free for a period of at least 18-months. In yet other embodiments, the containers are substantially precipitate free for a period of at least 24-months.

Methods of Making a Stabilized Hematoxylin Formulation

Some aspects of the present disclosure are directed to methods of making a stabilized hematoxylin formulation. Without wishing to be bound by any particular theory, it is believed that by lowering the pH of a hematoxylin formulation, the occurrence of precipitates may be mitigated or entirely prevented.

The active ingredient in the hematoxylin stain is hemalum (a complex of aluminum ion and hematein). Without wishing to be bound by any particular theory, it is believed that protons (H+) from the introduced acid can reverse a hemalum formation reaction (i.e. $Al^{3+}+Hm^-\rightarrow HmAl^++H$) and displace aluminum from the hemalum. Again, without wishing to be bound by any particular theory, it is believed that in order for a precipitate to form, hemalum must be present at high enough levels to start forming chains of hematein molecules and aluminum atoms. At low pH levels, it is believed that there is not enough hemalum present to form these chains.

In general, any hematoxylin solution, such as those comprising a mordant and an oxidant, may be stabilized by lowering the pH of the hematoxylin formulation using the compositions and methods described herein. By way of example, the hematoxylin solutions disclosed with Avwioro et al. "Histochemical Uses of Hematoxylin—A Review," JPCS Vol (1), April-June 2011, and Bryan D Llewellyn, "Hematoxylin Formulae," http://stainsfile.info, October 2013 may be stabilizing using the methods and components disclosed herein. In some embodiments, the starting hematoxylin formulation is one of Ehrlich's Alum Hematoxylin (e.g. a formulation comprising hematoxylin, ethanol, potassium alum, water, glycerol, glacial acetic acid), Harris Alum Hematoxylin (e.g. a formulation comprising hematoxylin, potassium alum, water, ethanol, mercuric oxide, and glacial acetic acid), Mayer's Hemalum (e.g. a formulation comprising hematoxylin, ammonium alum, potassium alum, water, ethanol, glycerol, sodium iodate, and glacial acetic acid), Cole's Hematoxylin (e.g. a formulation comprising hematoxylin, ammonium alum, water, ethanol, glycerol, iodine, and glacial acetic acid), Gill's Hematoxylin (e.g. a formulation comprising hematoxylin, aluminum sulphate, water, ethylene glycol, sodium iodate, and glacial acetic acid), Carazzi's Hematoxylin (e.g. a formulation comprising hematoxylin, potassium alum, water, glycerol, and sodium iodate), Iyiola, and Avwioro's Alum Hematoxylin.

In some embodiments, the starting hematoxylin solution is VENTANA HE 600 Hematoxylin Solution (available from Ventana Medical Systems, Tucson, AZ).

In some embodiments, the starting hematoxylin solution comprises water, a polyol, hematoxylin dye, sodium iodate, and aluminum sulfate hydrate. In other embodiments, the starting hematoxylin solution comprises distilled deionized water, a polyol, hematoxylin dye, sodium iodate, aluminum sulfate hydrate, hydroquinone, and a beta-cyclodextrin.

In general, the pH of a hematoxylin solution may be lowered by adding an acid to the hematoxylin formulation. In some embodiments, an amount of an acid is added such that the pH of the hematoxylin formulation is reduced by between about 2% to about 20%, i.e. an initial pH of the hematoxylin solution is reduced by between about 2% to about 20% to provide a hematoxylin solution having a second, lower pH. In other embodiments, an amount of an acid is added such that the pH of the hematoxylin formulation is reduced by between about 2.5% to about 15%. In yet other embodiments, an amount of an acid is added such that the pH of the hematoxylin formulation is reduced by between about 3% to about 12.5%. In further embodiments, an amount of an acid is added such that the pH of the hematoxylin formulation is reduced by between about 4% to about 12%. In even further embodiments, an amount of an acid is added such that the pH of the hematoxylin formulation is reduced by between about 5% to about 10%. The skilled artisan will be able to add an appropriate amount of acid to reduce the pH of the hematoxylin solution, regardless of the starting hematoxylin solution chosen.

In some embodiments, a change in the pH (i.e. a reduction in the pH) of the hematoxylin formulation upon addition of the acid is about 0.25 (i.e. a reduction of about 0.25 pH unites). In other embodiments, a change in the pH of the hematoxylin formulation upon addition of the acid is about 0.225. In other embodiments, a change in the pH of the hematoxylin formulation upon addition of the acid is about 0.2. In some embodiments, a change in the pH of the hematoxylin formulation upon addition of the acid is about 0.175. In other embodiments, a change in the pH of the hematoxylin formulation upon addition of the acid is about 0.15. In other embodiments, a change in the pH of the hematoxylin formulation upon addition of the acid is about 0.125. In other embodiments, a change in the pH of the hematoxylin formulation upon addition of the acid is about 0.1. In other embodiments, a change in the pH of the hematoxylin formulation upon addition of the acid is about 0.075.

In some embodiments, an amount of acid is added to a hematoxylin formulation such that the pH of the formulation is reduced to below 2.4. In other embodiments, an amount of acid is added to a hematoxylin formulation such that the pH of the formulation is reduced to below 2.35. In other embodiments, an amount of acid is added to a hematoxylin formulation such that the pH of the formulation is reduced to below 2.3. In other embodiments, an amount of acid is added to a hematoxylin formulation such that the pH of the formulation is reduced to below 2.25. In other embodiments, an amount of acid is added to a hematoxylin formulation such that the pH of the formulation is reduced to below 2.2. In other embodiments, an amount of acid is added to a hematoxylin formulation such that the pH of the formulation is reduced to below 2.15. In other embodiments, an amount of acid is added to a hematoxylin formulation such that the pH of the formulation is reduced to below 2.1.

In some embodiments, an acidifying solution is added to a hematoxylin formulation, the acidifying solution comprising a strong base and an additive. In some embodiments, the additive of the acidifying solution is one of a mordant, an oxidant, a shelf-life extending agent, and an anti-oxidant. The additive of the acidifying solution may be presented in the same amounts or ratios as described herein for the stabilized hematoxylin formulations described herein Readjustment Solution The present disclosure also provides readjustment solutions which may be mixed with the stabilized hematoxylin formulations disclosed herein. In general, the readjustment solution comprises a solvent and one of a strong base or a buffer. In some embodiments, the solvent is selected from those recited herein for stabilized hematoxylin formulations described herein. In some embodiments, the same solvent is used in the stabilized hematoxylin composition and the readjustment solution.

In some embodiments, the strong base is selected from the group consisting of sodium hydroxide, potassium hydroxide, lithium hydroxide, and ammonia. In some embodiments, the strong base is 1M sodium hydroxide. In other embodiments, the strong base is 0.5M sodium hydroxide. In yet other embodiments, the strong base is 0.1M sodium hydroxide.

In some embodiments, the buffer is selected from a maleate, a phosphate, a glycine, a citrate, a glycylglycine, a malate, a formate, a cyanoacetate, a succinate, an acetate, a propionate, fumarate, sulfate, alanine, arginine, isoleucine, leucine, noleucine, proline, serine, threonine, or any combination thereof. In some embodiments, the buffer has a pKa ranging from about 1.5 to about 3.5. In other embodiments, the buffer has a pKa ranging from about 1.8 to about 3.2. In yet other embodiments, the buffer has a pKa ranging from about 2 to about 3.

In some embodiments, the readjustment solution further comprises an additive selected from the group consisting of mordant, an oxidant, a shelf-life extending agent, and an anti-oxidant. The additive may be presented in the same amounts or rations as described herein.

Method of Readjusting the pH of a Stabilized Hematoxylin Formulation

Some aspects of the present disclosure are directed to readjusting the pH of a stabilized hematoxylin formulation to provide a hematoxylin staining solution. In some embodiments, the method comprises adding a strong base or a buffer solution to a stabilized hematoxylin formulation. In some embodiments, the method comprises adding a readjustment solution, such as described herein, to a stabilized hematoxylin formulation.

In some embodiments, a sufficient amount of strong base, buffer solution, or readjustment solution is added to the hematoxylin formulation such the pH of the stabilized hematoxylin formulation is increased to at least 2.4. In other embodiments, an amount of strong base, buffer solution, or readjustment solution is added to the hematoxylin formulation such the pH is increased to at least 2.45. In yet other embodiments, an amount of strong base, buffer solution, or readjustment solution is added to the hematoxylin formulation such the pH is increased to at least 2.5. In further embodiments, an amount of strong base, buffer solution, or readjustment solution is added to the hematoxylin formulation such the pH is increased to at least 2.55.

In some embodiments, the method comprises measuring an initial pH of an aliquot of a stabilized hematoxylin formulation, and adding an amount of a strong base, a buffer solution, or a readjustment solution until the pH of the aliquot is increased to at least about 2.4. In some embodiments, the method comprises measuring an initial pH of an aliquot of a stabilized hematoxylin formulation, and adding an amount of a strong base, a buffer solution, or a readjustment solution until the pH of the aliquot is increased to at least about 2.45. In some embodiments, the method comprises measuring an initial pH of an aliquot of a stabilized hematoxylin formulation, and adding an amount of a strong base, a buffer solution, or a readjustment solution until the pH of the aliquot is increased to at least about 2.5. In some embodiments, the method comprises measuring an initial pH of an aliquot of a stabilized hematoxylin formulation, and adding an amount of a strong base, a buffer solution, or a readjustment solution until the pH of the aliquot is increased to at least about 2.55.

In some embodiments, the present disclosure provides readjusted formulations, such as those hematoxylin staining solutions which include a solvent, hematoxylin dye, a mordant, an oxidant, and a formed salt. In some embodiments, the formed salt is a byproduct of a reaction between an acid and a strong base, e.g. NaCl).

Kits

In another aspect of the present disclosure are kits for preparing stabilized hematoxylin formulations, and kits for readjusting the pH of a stabilized hematoxylin formulation.

In some embodiments, the kit comprises a first component and a second component, wherein the first component comprises a stabilized hematoxylin composition comprising hematoxylin dye and an acid, wherein the stabilized hematoxylin composition has a pH of less than 2.4; and wherein the second component comprises a strong base or a buffer, the second component provided in an amount relative to the first component such that when the first and second components are mixed, the pH of a resulting hematoxylin staining solution is greater than 2.4. In some embodiments, the kit further comprises a means for ascertaining a change in pH as the first and second components are mixed together. In some embodiments, at least one of the first or second components comprises a mordant and an oxidant. In some embodiments, the kit further comprises instructions for mixing the first and second components. In some embodiments, the kit further comprises an additional stain.

In some embodiments, the kit comprises a first fluid dispenser and a second fluid dispenser, the first fluid dispenser comprising a stabilized hematoxylin formulation and the second fluid dispenser comprising one of a readjustment solution, a buffer, or a strong base.

In some embodiments, the kit comprises first and second components, the first component comprising a stabilized hematoxylin formulation having a pH of less than 2.4; and the second component comprising a readjustment solution. In some embodiments, the stabilized hematoxylin formulations comprise a solvent, a hematoxylin dye, an acid, a mordant, and an oxidant. In some embodiments, the kit further comprises instructions for mixing the first and second components to provide a hematoxylin staining solution having a pH of greater than 2.4. In some embodiments, the instructions describe a specific amount of the second component to add to the first component to provide a hematoxylin staining solution having a predetermined pH. In some embodiments, the first and second components are provided in separate fluid dispensers, each fluid dispenser suitable for use in an automated staining apparatus, such as disclosed herein. Suitable fluid dispenses include, but are not limited to, those disclosed in PCT Publication Number WO/2012/163992 and U.S. Pat. No. 6,192,945, the disclosures of which are hereby incorporated by reference herein in their entireties.

Methods of Staining a Biological Sample

Other aspects of the present disclosure are directed to methods of staining a biological sample with a hematoxylin formulation. In some embodiments, the method of staining a biological sample comprises (i) preparing a hematoxylin staining solution from a stabilized hematoxylin formulation; and (ii) introducing the hematoxylin staining solution to a biological sample. In some embodiments, the hematoxylin staining solution is prepared by adding a quantity of a readjustment solution to a stabilized hematoxylin formulation, such that the pH of the stabilized hematoxylin formulation increases to a pH that is suitable for staining. In some embodiments, the pH is increased to greater than 2.4. In some embodiments, a sufficient amount of readjustment solution is added such that the pH increases to greater than 2.5. In some embodiments, the readjustment solution comprises a strong base. In some embodiments, the readjustment solution comprises a buffer. In some embodiments, the readjustment solution comprises an additive.

In some embodiments, the method of staining a biological sample comprises (i) increasing the pH of an aliquot of a stabilized hematoxylin formulation to provide a hematoxylin staining solution having a pH ranging from between about 2.4 to about 2.6; and (ii) contacting a biological sample with the resulting hematoxylin staining solution. In some embodiments, the method further comprises the step of contacting the sample with an additional stain or counterstain. In some embodiments, the step of increasing the pH of the aliquot of the stabilized hematoxylin formulation comprises titrating into the stabilized hematoxylin formulation an amount of a readjustment solution until the pH of the formulation reaches a predetermined level.

In some embodiments, the method of staining a biological sample comprises (i) mixing a stabilized hematoxylin formulation and a readjustment solution to provide a hematoxylin staining solution having a pH of between 2.4 and about 2.6; and (ii) dispensing the hematoxylin staining solution to a biological sample. In some embodiments, a ratio of the stabilized hematoxylin formulation to the readjustment solution ranges from about 5:1 to about 25:1. In other embodiments, the ratio ranges from about 10:1 to about 20:1.

In some embodiments, the stabilized hematoxylin formulation and the readjustment solution are mixed for a period of time of between 1 second and about 400 seconds prior to the introduction of the resulting hematoxylin solution to the biological sample. In other embodiments, the stabilized hematoxylin formulation and the readjustment solution are mixed for a period of time of between 5 seconds and about 240 seconds prior to introducing the resulting hematoxylin solution to the biological sample. In yet other embodiments, the stabilized hematoxylin formulation and the readjustment solution are mixed for a period of time of between 5 seconds and about 120 seconds prior to introducing the resulting hematoxylin solution to the biological sample. In further embodiments, the stabilized hematoxylin formulation and the readjustment solution are mixed for a period of time of between 5 seconds and about 60 seconds prior to introducing the resulting hematoxylin solution to the biological sample.

In some embodiments, the stabilized hematoxylin formulation and the readjustment solution are introduced separately to the biological sample, either simultaneously or sequentially, and allowed to mix while in contact with the biological sample. In some embodiments, the readjustment solution comprises a buffer and the buffer is applied to the biological sample prior to the application of the stabilized hematoxylin formulation. In some embodiments, the buffer is applied to the sample and the stabilized hematoxylin formulation is titrated into the buffer present on the sample until the pH of the mixture reaches at predetermined level.

Systems for Hematoxylin and Eosin Staining

In some embodiments, the solutions and formulations described herein are manually applied or introduced to a sample or applied using a dip-and-dunk technique. In other embodiments, the solutions and formulations are applied or dispensed to a sample, such as by an automated staining apparatus. The skilled artisan will appreciate that the dispensing of any solution or formulation refers to the application of that solution or formulation to a sample or a substrate (e.g. a slide).

The method and compositions disclosed herein may be adapted for use with existing automated processing systems. For example, Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. published application Nos. 20030211630 and 20040052685, each of which is incorporated herein by reference. These systems may be adapted to be compatible with the present invention. Briefly, the automated slide processing system that are described in the aforementioned applications are high-volume slide processing system that shuttles trays holding a plurality of slides in substantially horizontal positions (to minimize cross-contamination) between workstations that perform various slide processing operations on the slides. Fresh reagents can be applied to each slide during processing, and cross-contamination of slides with reagents can be substantially eliminated because the slides are treated separately in spaced-apart fashion in the tray. In one configuration, the system includes a radiant heater, a combined de-paraffinizer/stainer/solvent exchanger workstation, a convection oven and a coverslipper. A tray of slides bearing paraffin-embedded tissue samples can be heated under the radiant heater of the system to spread the paraffin in the samples for easier removal and also to adhere the samples to the slides. The tray can then be transported to the multifunctional de-paraffinizer/stainer/solvent exchanger workstation, where slides can be de-paraffinized, stained, and solvent exchanged. A tray of stained slides that is ready for coverslipping can then be shuttled to the coverslipper of the system where coverslips are added to the slides. Once the slides are coverslipped, the tray can then be transported to the convection oven to cure the coverslips on the stained slides. The high volume stainer just described is commercially available from Ventana Medical Systems, Inc, Tucson, Ariz.

Examples of other commercially available specimen processing systems through which the solutions and formulations described herein may be applied include the VENTANA SYMPHONY (individual slide stainer) and the VENTANA HE 600 (individual slide stainer) series; the Dako CoverStainer (batch stainer) from Agilent Technologies; the Leica ST4020 Small Linear Stainer (batch stainer), Leica ST5020 Multistainer (batch stainer), and the Leica ST5010 Autostainer XL series (batch stainer) H&E stainers from Leica Biosystems Nussloch GmbH.

While the staining systems described above may be configured to perform any histological staining process, an exemplary hematoxylin and eosin staining protocol comprises a baking step to adhere the samples to the slides, a de-paraffinization step to remove paraffin from paraffin-embedded samples, a hematoxylin staining step (that can utilize the disclosed hematoxylin compositions), a bluing step that raises the pH and turns the hematoxylin blue to provide better contrast with the eosin added downstream, an eosin staining step, a differentiation step that is used to remove excess eosin and turn the eosin various shades of red to pink, a dehydration step to remove water from the sample using 100% ethanol, a step in which the slides are exposed to an elevated temperature and air flow to remove the ethanol, a coverslipping step in which limonene is dispensed to the sample, and a curing step.

In some embodiments, an automated staining system comprises a separate reservoirs or containers containing separate stabilized hematoxylin formulation and readjustment solution. In some embodiments, the systems further comprise a dispensing system that delivers the stabilized hematoxylin formulations and readjustment solutions to the biological sample, e.g. a biological sample mounted on a slide. In some embodiments, the stabilized hematoxylin formulation and readjustment solution are combined prior to application to the biological sample. In some embodiments, a container of stabilized hematoxylin formulation and a container of readjustment solution are pressurized and fluidically connected to a mixing receptacle. The mixing receptacle can be any container capable of holding or transporting the mixed solution such as a rigid or flexible tube. In some embodiments, the mixing receptacle is a tube that is fluidically connected to a dispenser. In some embodiments, the stabilized hematoxylin formulation and readjustment solution are fluidically connected to a T-fitting via tubing. The output from the T fitting is in turn fluidically connected to the dispenser. In these embodiments, the stabilized hematoxylin formulation and readjustment solution are fed into the T fitting and mixing of the solutions occurs in the tube leading out of the T fitting. In some embodiments, the stabilized hematoxylin formulation and readjustment solution are separately dispensed onto the biologically sample. In these embodiments, the solutions can be allowed to mix by diffusion on the sample or mechanically mixed, for example, by agitation with a pipette.

In some embodiments, the automated specimen processing apparatus may include a carousel for holding a plurality of substrates, e.g. microscope slides, wherein each substrate includes a biological sample to be stained. In some embodiments, the automatic staining equipment can also include a device for rotating the carousel at predetermined speeds and a mechanism for directing and controlling application of reagents, including the solutions and formulations described herein, onto the substrates and samples during rotation of the carousel. In some embodiments, once the slides are loaded into the instrument, test protocols will dictate which fluids are dispensed onto the substrates at specific times. At the appropriate time, in some embodiments, a dispenser rack will rotate to align a correct fluid over a substrate and the instrument will dispense a predetermined amount of a fluids onto the substrate. In some embodiments, the instrument will allow the fluid to remain in contact with the biological sample for a predetermined amount of time.

In some embodiments, the system is an automated slide processing system that includes a slide tray holding a plurality of slides in a substantially horizontal position (such as in two rows where the slides are held at an angle between about 0.2 degrees and about 1.2 degrees from horizontal) and one or more workstations (for example, arranged in a vertical stack) that receive the slide tray and perform one or more slide processing operations on slides in the slide tray. In some embodiments, the workstation can perform a slide processing operation on one or more individual slides in a slide tray, for example, at least two or four slides in a slide tray, or it can simultaneously perform a slide processing operation on all of the slides in a slide tray. In some embodiments, the one or more workstations dispense a reagent to slides in the slide tray without a substantial amount of the reagent that contacts a first slide contacting a second slide, thereby minimizing cross-contamination between slides. Such workstations can include one or more directional nozzles that dispense the reagent onto the slides, for example, the one or more directional nozzles can include a pair of directional nozzles that dispense the reagent in opposite directions across a surface of a slide. In more particular embodiments, the one or more directional nozzles can further include a directional nozzle that dispenses the reagent towards a bottom surface of a slide. In other particular embodiments, the one or more workstations can simultaneously dispense a reagent (for example, the same reagent) to at least two slides held in a slide tray within a given workstation, or the one or more workstations can simultaneously dispense a reagent (such as the same reagent) to all of the slides held in the slide tray within a given workstation. Additional system components and tray configurations (as well as control systems) are described in U.S. Pat. Nos. 8,663,991, 7,468,161, and 9,528,918, the disclosures of which are hereby incorporated by reference herein in their entireties.

In some embodiments, the present disclosure provides an apparatus for automatically treating biological specimens, comprising: at least one slide tray holding a plurality of slides in substantially horizontal positions, wherein said biological specimens are located on said slides; one or more workstations that receive said slide tray and perform one or more slide processing operations on said plurality of slides held in said slide tray; a transporter that moves said slide tray into and out of said one or more workstations; a fluidics module in fluid communication with said one or more workstations that supplies a reagent to said one or more workstations; a pneumatics module in fluid communication with said one or more workstations and said fluidics module; wherein said pneumatics module supplies vacuum and/or pressurized gas to said one or more workstations and said fluidics module; and a control module in electrical communication with said transporter, said one or more workstations, said fluidics module and said pneumatics module, wherein said control module coordinates function of components of the apparatus during treatment of said biological specimens. The apparatus may be adapted for delivering one or more of the solutions and/or formulations described herein.

Counterstains

In some embodiments, the systems and methods further comprise staining of biological samples with additional stains, such as counterstains. In some embodiments, contacting the sample with a counterstain comprises contacting the sample with one or more of eosin Y (CAS Number 15086-94-9), orange G (CAS Number 1936-15-8), light green SF yellowish (CAS Number 5141-20-8), Bismark Brown (CAS Number: 8005-77-4), fast green FCF (CAS Number 2353-45-9), OG-6 (including Orange G), EA25 (including light green SF, Bismarck brown, and eosin Y), EA36 (including light green SF, Bismarck brown, and eosin Y), EA50 (including light green SF, Bismarck brown, and eosin Y) and EA65 (including light green SF, Bismarck brown, and eosin Y). The formulas and methods of making such counterstains can be found, for example, in the Stains-File (an internet resource for histotechnologists maintained by Bryan Llewellyn); Kiernan, "Histological and Histochemical methods: Theory and Practice," 3rd Ed. Butterworth Heinemann, Oxford, UK; and in Horobin and Kiernan, "Conn's biological stains: a handbook of dyes, stains and fluorochromes for us in biology and medicine," 10th ed., Oxford: BIOS, ISBN 1859960995, 2002. In other embodiments, contacting the sample with the hematoxylin composition comprises a progressive hematoxylin staining protocol. In other embodiments, contacting the sample with the hematoxylin composition comprises a regressive hematoxylin staining protocol. The method can be automated and can be performed on a biological sample that is supported on a substrate such as a microscope slide. In particular embodiments, the method is used to stain a tissue section, or a cytology sample mounted on a microscope slide. In particular embodiments further including a counterstaining step, the method can be a hematoxylin and eosin staining method or a PAP staining method, and more particularly an automated hematoxylin and eosin or PAP staining method.

Other histological stains useful in conjunction with the staining procedures of the present invention include dyes such as acridine dyes, anthraquinone dyes, arylmethane dyes, azo dyes, diazonium dyes, nitro dyes, phthalocyanine dyes, quinine imine dyes, tetrazolium dyes, thiazole dyes and xanthene dyes. Examples of dyes useful for histological staining include acetyl yellow, acid black 1, acid blue 22, acid blue 93, acid fuchsin, acid green, acid green 1, acid green 5, acid magenta, acid orange 10, acid red 4, acid red 26, acid red 29, acid red 44, acid red 51, acid red 66, acid red 73, acid red 87, acid red 91, acid red 92, acid red 94, acid red 101, acid red 103, acid roseine, acid rubin, acid violet 19, acid yellow 1, acid yellow 9, acid yellow 23, acid yellow 24, acid yellow 36, acid yellow 73, acid yellow S, acid yellow T, acridine orange, acriflavine, alcian blue, alcian yellow, alcohol soluble eosin, alizarin, alizarin blue, alizarin blue 2RC, alizarin carmine, alizarin cyanin BBS, alizarol cyanin R, alizarin red S, alizarin purpurin, aluminon, amido black 10B, amidonaphthol red, amidoschwarz, aniline blue WS, aniline purple, anthracene blue SWR, anthracene blue SWX, auramine 0, azo-eosin, azocarmine B, azocarmine G, azoeosin G, azoic diazo 5, azoic diazo 48, azophloxine, azovan blue, azure A, azure B, azure C, basic blue 8, basic blue 9, basic blue 12, basic blue 15, basic blue 17, basic blue 20, basic blue 26, basic brown 1, basic fuschsin, basic green 4, basic green 5, basic orange 14, basic red 2, basic red 5, basic red 9, basic violet 2, basic violet 4, basic violet 10, basic violet 14, basic yellow 1, basic yellow 2, Biebrich scarlet, Biebrich scarlet R, Bismarck brown Y, brazilein, brazilin, brilliant crocein, brilliant crystal scarlet 6R, calcium red, carmine, carminic acid carmoisine 6R, Celestine blue B, china blue, chlorantine fast red 5B, cochineal, coelestine blue, Chicago blue 4B, chrome violet CG, chromotrope 2R, chromoxane cyanin R, congo Corinth, Congo red, cotton blue cotton red, croceine scarlet crocein scarlet 3B, crocein scarlet MOO, crocin, crystal ponceau 6R, crystal scarlet, crystal violet, dahlia, diamond green B, direct blue 14, direct blue 58, direct red, direct red 10, direct red 28, direct red 80, direct red 81, direct yellow 7, durazol blue 4R, durazol blue 8G, eosin B, eosin bluish, eosin, eosin Y, eosin yellowish, eosinol, Erie garnet B, eriochrome cyanin R, erythrosine B ethyl eosin, ethyl green, ethyl violet, Evan's blue, fast blue B, fast green FCF, fast red B, fast yellow, fast yellow extra, fast yellow G, fat black HB, fluorescein, food green 3, galleon, gallamine blue gallocyanin, gentian violet, helio fast rubin BBL, helvetia blue, Hoffman's violet, hydrazine yellow, imperial red, ingrain blue 1, ingrain yellow 1, INT, Kermes, kermesic acid, kemechtrot, Lac, laccaic acid, Lauth's violet, light green, lissamine fast yellow, lissamine green SF, Luxol fast blue, magenta 0, magenta I, magenta II, magenta III, malachite green, Manchester brown, Martius yellow, mauve, mauveine, merbromin, mercurochrome, metanil yellow, methylene azure A, methylene azure B, methylene azure C, methylene blue, methylene green, methyl blue, methyl green, methyl violet, methyl biolet 2B, methyl violet 10B, milling yellow 3G, mordant blue 3, mordant blue 10, mordant blue 14, mordant blue 23, mordant blue 32, mordant blue 45, mordant red 3, mordant red 11, mordant violet 25, mordant violet 39, naphthalene blue black, naphthol blue black, naphthol green B, naphthol yellow S, natural black 1, natural red, natural red 3, natural red 4, natural red 8, natural red 16, natural red 24, natural red 25, natural red 28, natural yellow 6, NBT, neutral red, new fuchsin, Niagara blue 3B, night blue, Nile blue, Nile blue A, Nile blue sulfate, Nile red, nitro BT, nitro blue tetrazolium, nuclear fast red, oil red 0, orange G, orcein, pararosanilin, Perkin's violet, phloxine B, picric acid, Ponceau 2R, Ponceau 6R, Ponceau B, Ponceau de Xylidine, Ponceau S, pontamine sky blue 5B, primula, primuline, purpurin, pyronin B, pyronin G, pyronin Y, rhodamine B, rosanilin, rose Bengal, saffron, safranin 0, scarlet R scarlet red, Scharlach R, shellac, sirius red F3B, sirius red 4B, sirius supra blue F3R, solochrome cyanin R, soluble blue, solvent black 3, solvent blue 38, solvent red 23, solvent red 24, solvent red 27, solvent red 45, solvent yellow 94, spirit soluble eosin, Sudan III, Sudan IV, Sudan black B, Sudan red BK, sulfur yellow S, Swiss blue, tartrazine, thioflavine S, thioflavine T, thionin, toluidine blue, toluoyline red, tropaeolin G, trypaflavine, trypan blue, uranin, Vicoria blue 4R, Victoria blue B, Victoria blue R, Victoria green B, water blue I, water soluble eosin, woodstain scarlet, Xylidine ponceau, and yellowish eosin, and combinations thereof. Formulas and methods of making and using histochemical dye solutions discussed in this paragraph (such as in "special stain" procedures in particular histological contexts, or as counterstains) can be found, for example, in the StainsFile (an internet resource for histotechnologists maintained by Bryan Llewellyn); Kiernan, "Histological and Histochemical methods: Theory and Practice," 3rd Ed. Butterworth Heinemann, Oxford, UK; and in Horobin and Kiernan, "Conn's biological stains: a handbook of dyes, stains and fluorochromes for us in biology and medicine," 10th ed., Oxford: BIOS, ISBN 1859960995, 2002. The contents of the two bound references cited immediately above are incorporated by reference herein.

EXAMPLES

The following non-limited examples are provided to further illustrate certain embodiments of the present disclosure.

To produce a functional dye, hematoxylin is oxidized to hematein and subsequently is bound to one of several metal ions including aluminum ($Al^{+3}$), iron ($Fe^{+3}$) and chromium ($Cr^{+3}$). A number of different aluminum salts may be used as a source of $Al^{+3}$. These include aluminum ammonium sulfate $[AlNH_4(SO_4)_2]$, aluminum sulfate $[Al_2(SO_4)_3]$ and aluminum potassium sulfate$[AlK(SO_4)_2]$. A metallic ion bound to a dye that is involved in the binding of the dye to tissue is referred to as a mordant. Conversion of hematoxylin to hematein may be accomplished by the action of a number of agents. Currently, most formulations incorporate a chemical oxidant such as sodium iodate that rapidly converts hematoxylin to hematein. Concentrations of sodium iodate typically are based upon the amount of hematoxylin and usually range from 0.10 to 0.20 grams of sodium iodate per gram of hematoxylin.

Example 1

A 2 L batch of VENTANA HE 600 Hematoxylin Solution was split into four equal volumes of 500 mL each and their pH levels were adjusted by adding 1 M hydrochloric acid to each of them as shown in Table 1. In some embodiments, the VENTANA HE 600 Hematoxylin Solution comprised distilled deionized water (about 700 g/L), ethylene glycol (about 280 g/L), hematoxylin dye (about 6 g/L), sodium iodate (about 0.65 g/L), aluminum sulfate 16-18 hydrate (about 27 g/L), hydroquinone (about 9 g/L), and beta-cyclodextrin (about 11 g/L).

TABLE 1 pH Adjustment of Hematoxylin Samples

| Assigned Sample ID | Volume of HCl added | Initial pH | Final pH |
|---|---|---|---|
| EXP1-A | 0 mL | 2.48 | 2.48 |
| EXP1-B | 2 mL | 2.48 | 2.37 |
| EXP1-C | 4 mL | 2.48 | 2.26 |
| EXP1-D | 6 mL | 2.48 | 2.16 |

Each Hematoxylin sample was placed in 4mm sealed tubing loops (30 cm long) and the tubes containing the samples were placed in an oven held at 60° C. for 14 days. After 14 days, the loops were removed from the oven, drained, and rinsed with DI water. Each of the tubes showed a precipitate coating, but there was less precipitate coating on the tube that contained EXP1-D (pH=2.16).

The above tubing loop experiment was repeated with samples held in the tubing loops at 60° C. for 7 days. After only 7 days of incubating, there was a noticeable difference in the amount of precipitate coating on the different tubes (See FIG. 1). There was a distinct increase in precipitate coating as the pH of the solution was increased.

Figure 2:
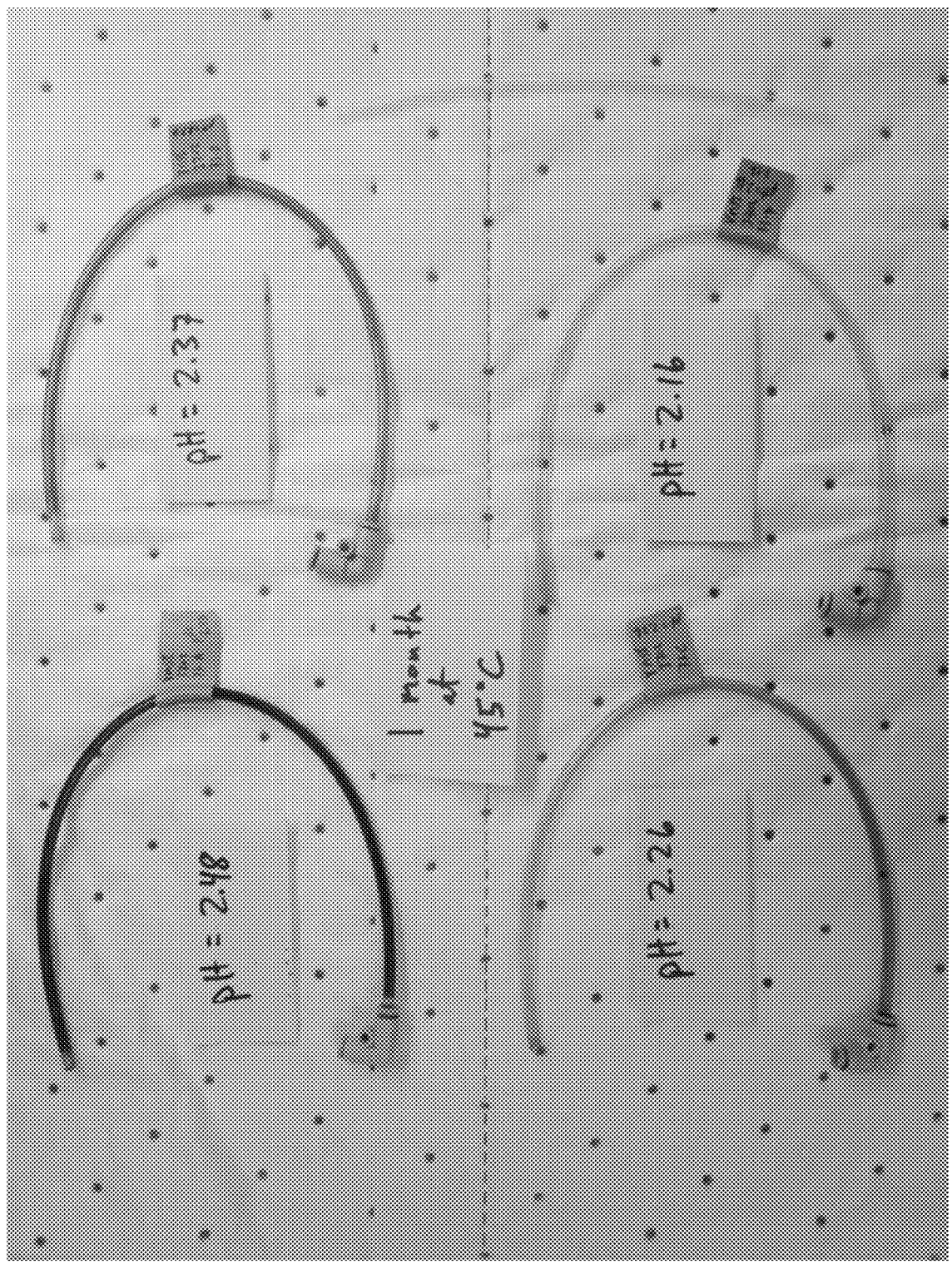
FIG. 2 illustrates four tubes comprising stabilized hematoxylin formulations having pHs of 2.16, 2.26, 2.37, and 2.48 (pH reduced using hydrochloric acid). At thirty days of incubation at 45° C., the tubing having a pH of 2.16 and 2.26 showed the least amount of precipitate.

The tubing loop experiment described above was repeated with samples held in the tubing loops at 45° C. for 30 days. Again, a noticeable difference in the amount of precipitate coating on the tubes was observed (See FIG. 2). As before, the amount of precipitate coating on the tubes increased as the pH of the hematoxylin solution increased.

Example 2

After about 180 days, the pH of a portion of the previously pH-adjusted hematoxylin samples (see Table 1) was readjusted back to about pH=2.5 with 0.1 M sodium hydroxide solution (see Table 2).

TABLE 2 pH Readjustment of Hematoxylin Samples (100 mL sample)

| Initial Sample ID | Volume of NaOH added | Initial pH | Final pH | Final Sample ID |
|---|---|---|---|---|
| EXP1-A | 0 mL | 2.48 | 2.48 | EXP1-A |
| EXP1-B | 4.0 mL | 2.37 | 2.51 | EXP2-A |
| EXP1-C | 6.5 mL | 2.26 | 2.51 | EXP2-B |
| EXP1-D | 10.0 mL | 2.16 | 2.51 | EXP2-C |

The pH-readjusted samples were then used in staining experiments (staining of slides of 5 in 1 multi-tissue blocks (MTB)). EXP1-A was used as a control and compared against the other three stains (EXP2-A, EXP2-B, and EXP2-C) in an 8-paired comparison study.

Every slide stained with the control (EXP1-A) showed a significant amount of precipitate on the slides. The slides stained with solutions held at lower pH levels (EXP2-A, EXP2-B, and EXP2-C) showed no precipitate on the slides. Other than the remarkable differences in precipitate level, there were no other significant differences seen between the stained slides.

Example 3

After about 500 days, it was noted that the bottle containing the sample that did not receive any pH adjustment (EXP1-A) showed a heavy coat of precipitate on the inside surface. The bottles containing the samples that had undergone pH adjustment (EXP1-A, EXP1-B, EXP1-C, and EXP 1-D) showed no precipitate film.

At this time (500 days), the pH levels of a portion of the previously pH-adjusted hematoxylin samples (see Table 1) were readjusted to about pH=2.5 with a 1.2 M cyanoacetic acid/cyanoacetate buffer solution (pH=2.6). See Table 3. In this case, a buffer rather than a strong base was used to readjust the solution pH to a level that is acceptable for staining. During pH readjustment, if too much strong base is added, the target pH level can be easily overshot by several pH units. A buffer is more forgiving when it comes to readjusting the pH. If too much buffer is added, the target pH may be overshot by only a small amount or not at all depending on the pH and concentration of the buffer used.

TABLE 3 pH Readjustment of Hematoxylin Samples (100 mL sample)

| Initial Sample ID | Volume of buffer added | Initial pH | Final pH | Final Sample ID |
|---|---|---|---|---|
| EXP1-B | 10 mL | 2.37 | 2.59 | EXP3-A |
| EXP1-C | 10 mL | 2.26 | 2.54 | EXP3-B |
| EXP1-D | 10 mL | 2.16 | 2.50 | EXP3-C |

The pH-readjusted samples identified within Table 3 were then used in staining experiments (staining of slides of 5 in 1 multi-tissue blocks (MTB)). A control (a current, non-expired lot of Ventana HE 600 Hematoxylin Solution, part no. 07024282001), was compared against samples EXP3-A, EXP3-B, and EXP3-C. It was found that the stains that were held below pH~2.30 for 500 days (EXP3-B and EXP3-C) showed only minimal or no precipitate on the slides.

Example 4

After about 550 days, the pH levels of a portion of the previously pH-adjusted hematoxylin samples (see Table 1) were adjusted to about pH=2.5 with a VENTANA HE 600 Bluing Solution (0.1 M TRIS buffer, pH=8-9). See Table 4.

TABLE 4 pH Readjustment of Hematoxylin Staining Solutions

| Solution ID | Volume of Hematoxylin Solution Readjusted | Amount of VENTANA HE 600 Bluing Solution Added | Initial pH | Final pH |
|---|---|---|---|---|
| EXP1-B | 100 mL | 5.0 mL | 2.39 | 2.50 |
| EXP1-C | 100 mL | 8.3 mL | 2.31 | 2.50 |
| EXP1-D | 100 mL | 13.0 mL | 2.21 | 2.50 |

No other experiments were performed with pH-readjusted solutions provided in Table 4. The pH readjustment was carried out to prove the concept that a readily available reagent (VENTANA HE 600 Bluing Solution) could be used to readjust the pH of the acidic hematoxylin solutions.

Example 5

Without to be bound by any particular theory, it is believed that the presence of chloride ion in a hematoxylin staining solution may reduce the rate of precipitate formation in the solution. Examples 1 through 4 were designed and carried out using hydrochloric acid as the acidifying agent. This introduced chloride ion into the hematoxylin staining solutions and one could argue that the precipitate inhibition effects could have been due to the presence of chloride ion and not just the low pH levels of the solutions. To separate the effects of chloride ion and low pH, the pH adjustments to lower the pH of a hematoxylin stain in this experiment were carried out with the addition of sulfuric acid. A hematoxylin staining solution was prepared using the following formula shown in Table 5.

TABLE 5

Hematoxylin Staining Solution Formulation

| Ingredient | Amount |
|---|---|
| DI Water | 650 mL |
| Propylene glycol | 250 mL |
| Hematoxylin dye | 6.00 g |
| Sodium iodate | 0.65 g |
| Aluminum sulfate hexadecahydrate | 26.67 g |
| DI Water | To 1 L |

The solution was split into 5 equal portions of 200 mL each. The pH levels of the 5 different solutions were adjusted with 0.25 M sulfuric acid as shown in Table 6.

TABLE 6 pH Adjustment of Hematoxylin Staining Solutions

| Solution ID | Amount of Sulfuric Acid Added | Initial pH | Final pH |
|---|---|---|---|
| EXP4-A | 0.7 mL | 2.57 | 2.53 |
| EXP4-B | 2.0 mL | 2.57 | 2.43 |
| EXP4-C | 4.0 mL | 2.57 | 2.33 |
| EXP4-D | 5.0 mL | 2.57 | 2.25 |
| EXP4-E | 7.0 mL | 2.57 | 2.16 |

Figure 3:
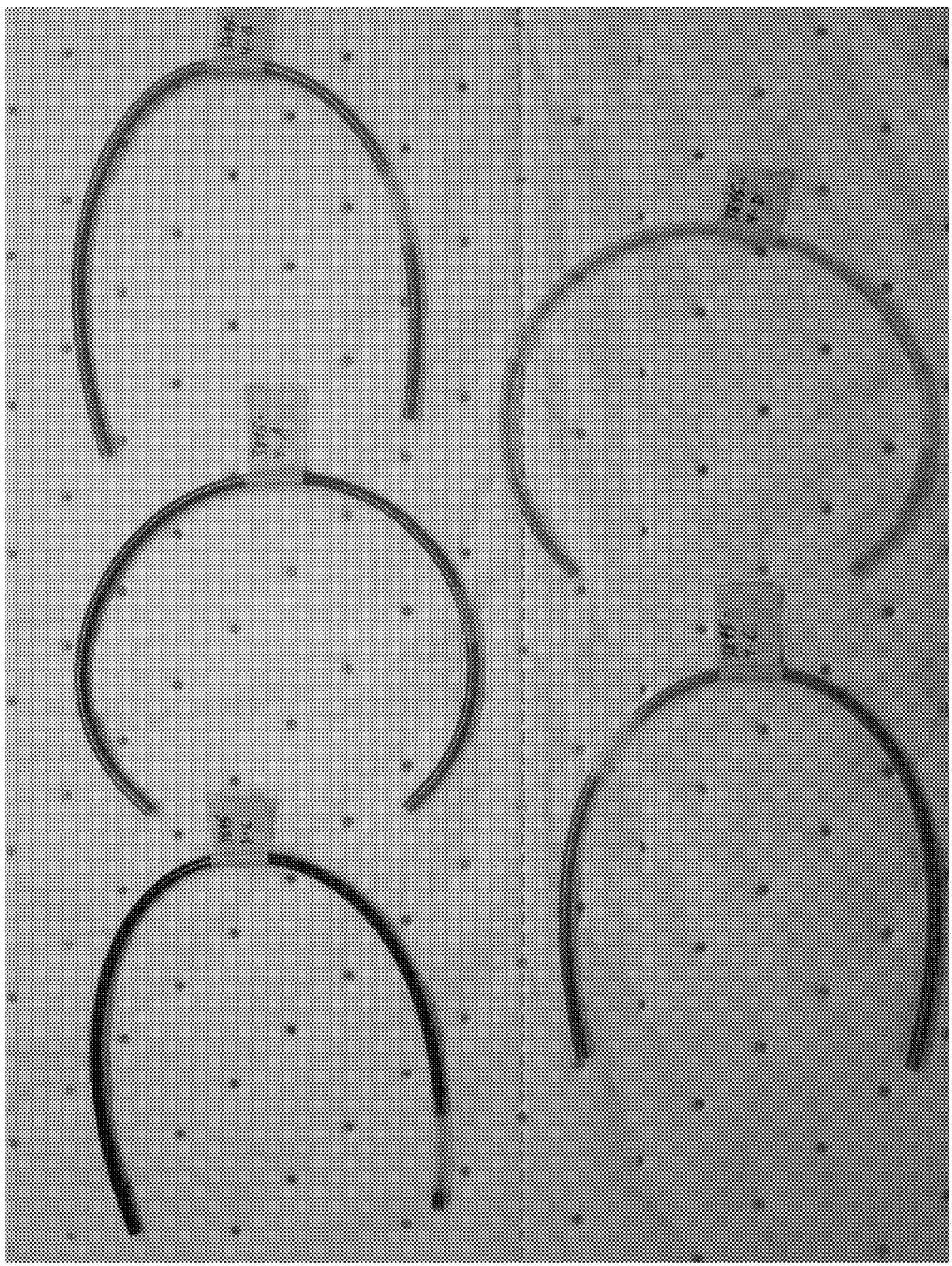
FIG. 3 illustrates five tubes comprising stabilized hematoxylin formulations having pHs of 2.16, 2.25, 2.33, 2.43, and 2.53 (pH reduced using sulfuric acid). At seven days of incubation at 60° C., the tubing having a pH of 2.16 and 2.25 showed the least amount of precipitate.

A sample of each hematoxylin solution were placed in 4 mm sealed tubing loops (30 cm long) and the tubes containing the samples were placed in an oven held at 60° C. for 7 days. The tubes were drained of their hematoxylin solution and rinsed with DI water. Each of the tubes showed a film of hematoxylin precipitate, but the level of precipitate coating was different depending on the solution pH. Those solutions with higher pH levels left a greater amount of precipitate coating on the tubing loop surface. This is illustrated in FIG. 3.

Figure 4:
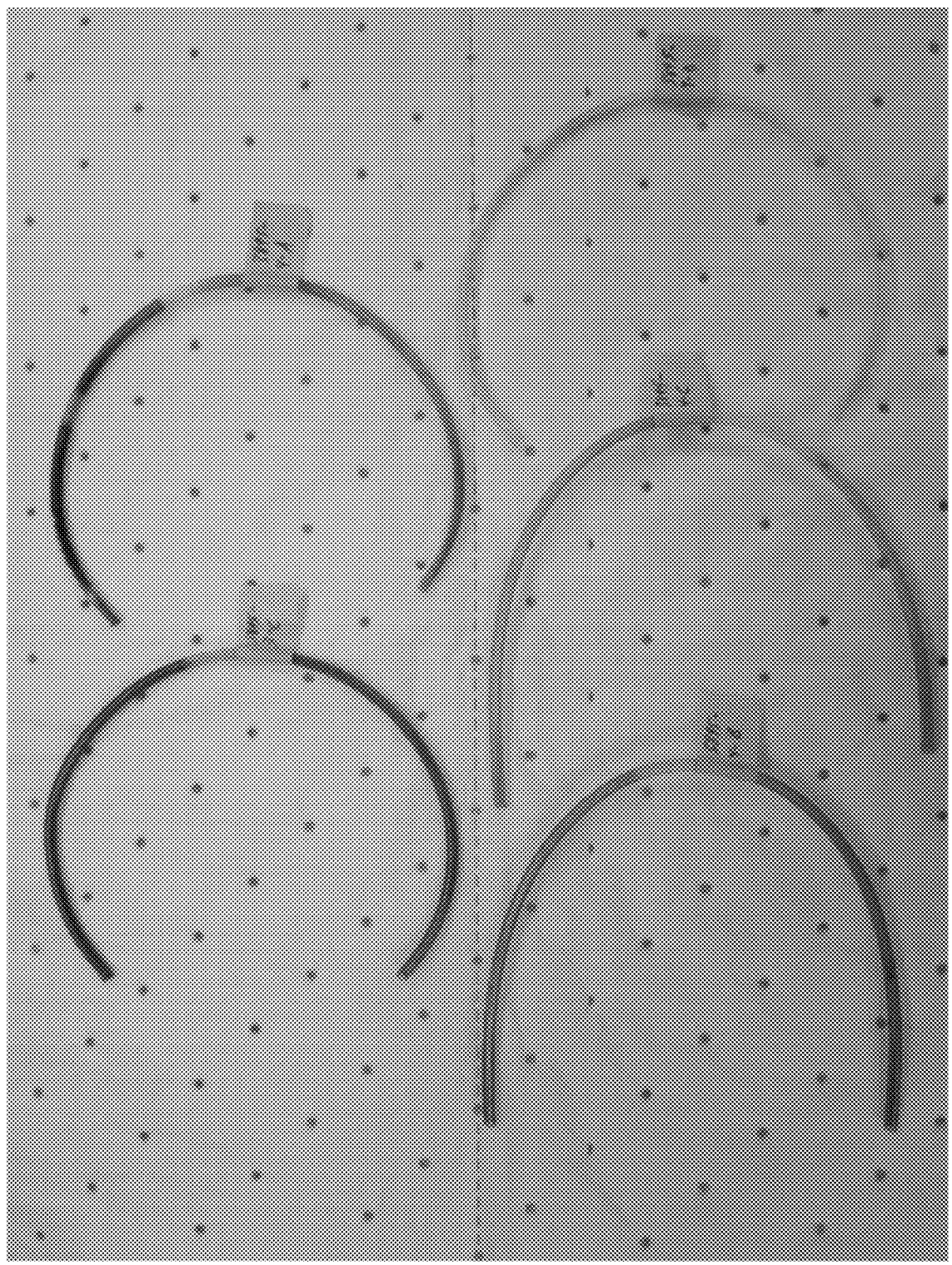
FIG. 4 illustrates five tubes comprising stabilized hematoxylin formulations having pHs of 2.16, 2.25, 2.33, 2.43, and 2.53 (pH reduced using sulfuric acid). At twenty-nine days of incubation at 45° C., the tubing having a pH of 2.16 and 2.25 showed the least amount of precipitate.

The tubing loop experiment was then repeated, but at 45° C. for 29 days. The same trend was observed. The solutions with the higher pH levels showed greater precipitation amounts on the tubing surface (see FIG. 4).

Example 6

After about 360 days, the pH levels of the previously pH-adjusted hematoxylin samples (see Table 6) were adjusted to about pH=2.5 with a 1.2 M cyanoacetic acid/cyanoacetate buffer solution (pH=2.6). See Table 7.

TABLE 7 pH Readjustment of Hematoxylin Samples (100 mL sample)

| Initial Sample ID | Volume of buffer added | Initial pH | Final pH | Final Sample ID |
|---|---|---|---|---|
| EXP4-B | 10 mL | 2.37 | 2.57 | EXP5-A |
| EXP4-C | 10 mL | 2.30 | 2.54 | EXP5-B |
| EXP4-D | 10 mL | 2.24 | 2.52 | EXP5-C |
| EXP4-E | 10 mL | 2.15 | 2.49 | EXP5-D |

The pH-readjusted samples identified within Table 7 were then used in staining experiments (staining of slides of 5 in 1 multi-tissue blocks (MTB)). A control (a current, non-expired lot of Ventana Hematoxylin Solution, part no. 07024282001), was compared against samples ANS Rev D002 (a current, non-expired lot) was used as a control and compared against the other four stains (EXP5-A, EXP5-B, EXP5-C, EXP5-D). The stains that were held below pH-2.25 for 360 days (EXP5-C and EXP5-D) showed only minimal or no precipitate on the slides.

Example 7

After about 400 days, the pH levels of the previously pH-adjusted hematoxylin samples (see Table 6) were adjusted to about pH=2.5 with a VENTANA HE 600 Bluing Solution (0.1 M TRIS buffer, pH=8-9). See Table 8. No other experiments were performed with these pH-readjusted solutions. The pH readjustment was carried out to prove the concept that a readily available reagent (VENTANA HE 600 Bluing Solution) could be used to readjust the pH of the acidic hematoxylin solutions.

TABLE 8 pH Readjustment of Hematoxylin Staining Solutions

| Solution ID | Volume of Hematoxylin Solution Readjusted | Amount of VENTANA HE 600 Bluing Solution Added | Initial pH | Final pH |
|---|---|---|---|---|
| EXP4-B | 50 mL | 2.5 mL | 2.40 | 2.50 |
| EXP4-C | 50 mL | 4.5 mL | 2.31 | 2.50 |
| EXP4-D | 50 mL | 6.0 mL | 2.26 | 2.51 |
| EXP4-E | 50 mL | 8.0 mL | 2.18 | 2.50 |

Analysis

Applicants have discovered that by keeping the pH of hematoxylin staining solutions low (e.g. a pH of less than 2.4), the rate of precipitate formation may be significantly reduced. This was shown using two different hematoxylin staining solutions using both hydrochloric acid and sulfuric acid as acidifying agents to lower the pH of the staining solutions. To bring the previously acidified hematoxylin staining solutions back up to an acceptable pH for staining, it was found that a strong base solution (sodium hydroxide solution) or pH buffered solutions (cyanoacetic acid/cyanoacetate solution, TRIS/H-TRIS$^+$ solution) were all effective.

Hematoxylin solutions aged much longer than 1 year showed staining differences (hue and non-specific staining) when compared to newly prepared solutions. This is not surprising as this effect is commonly observed when comparing old and new formulations of hematoxylin stain. What is remarkable is the lack of precipitate found in the aged solutions when their pH levels have been dropped during the aging process.

By initially formulating hematoxylin solutions with a low pH (pH<~2.4), the solution can be stored and remain stable for months at a time. Readjustment of the pH at the time of staining provides normal hematoxylin staining. Using this formulation, it is possible to produce quality hematoxylin stains from staining solutions that do not readily precipitate.

Additional Embodiments

Additional Embodiment (1) A stabilized hematoxylin formulation comprising hematoxylin dye and an acid in an amount ranging from about 0.2% to about 4% by total volume of the hematoxylin solution, and wherein the hematoxylin solution has a pH of less than 2.4.

Additional Embldiment (2) The stabilized hematoxylin formulation of additional embodiment 1, wherein the pH is less than 2.3.

Additional Embldiment (3) The stabilized hematoxylin formulation of additional embodiment 1, wherein the pH is less than 2.2.

Additional Embldiment (4) The stabilized hematoxylin formulation of additional embodiment 1, wherein the pH is less than 2.1.

Additional Embldiment (5) The stabilized hematoxylin formulation of additional embodiment 1, wherein the pH ranges from between about 2.1 to about 2.2

Additional Embldiment (6) The stabilized hematoxylin formulation of any of the preceding additional embodiments, wherein the acid is selected from the group consist of hydrochloric acid, sulfuric acid, perchloric acid and nitric acid.

Additional Embldiment (7) The stabilized hematoxylin formulation of any of the preceding additional embodiments, further comprising a mordant, and an oxidant.

Additional Embldiment (8) The stabilized hematoxylin formulation of any of the preceding additional embodiments, further comprising a shelf-life extending agent.

Additional Embldiment (9) The stabilized hematoxylin formulation of additional embodiment 4, wherein the shelf-life extending agent is a polyol.

Additional Embldiment (10) The stabilized hematoxylin formulation of additional embodiment 5, wherein the polyol is selected from the group consisting of propylene glycol, ethylene glycol, and mixtures thereof.

Additional Embldiment (11) The stabilized hematoxylin formulation of additional embodiment 1, wherein the formulation consists essentially of hematoxylin dye, a mordant, an oxidant, and the acid.

Additional Embldiment (12) The stabilized hematoxylin formulation of additional embodiment 11, wherein the oxidant is sodium iodate and wherein the mordant comprises aluminum.

Additional Embldiment (13) A method of staining a biological sample comprising increasing a pH of an aliquot of the stabilized hematoxylin formulation of any of additional embodiments 1 to 12 to provide a hematoxylin staining solution having a pH ranging from about 2.4 to about 2.6, and contacting the biological sample with the hematoxylin staining solution having the pH ranging from about 2.4 to about 2.6.

Additional Embldiment (14) The method of additional embodiment 7, wherein the pH of the aliquot of the stabilized hematoxylin formulation is increased by adding a readjustment solution comprising a strong base or a buffer.

Additional Embldiment (15) The method of additional embodiment 14, wherein the strong base is selected from the group consisting of sodium hydroxide, potassium hydroxide, lithium hydroxide, and ammonia.

Additional Embldiment (16) The method of additional embodiment 14, wherein the buffer has a pKa ranging from about 1.5 to about 3.5.

Additional Embldiment (17) The method of additional embodiment 14, wherein the readjustment solution comprises an additive selected from the group consisting of a shelf-life extending agent, an oxidant, and a mordant.

Additional Embldiment (18) The method of any of additional embodiments 7 to 17, wherein the pH of the stabilized hematoxylin formulation is increased prior to contacting the biological sample with the hematoxylin staining solution.

Additional Embldiment (19) The method of any of additional embodiments 7 to 17, wherein the biological sample comprises a tissue section or a cytology sample Additional Embldiment (20) A kit comprising a first component and a second component,
the first component comprising a stabilized hematoxylin formulation comprising a hematoxylin dye and an acid in an amount ranging from about 0.1% to about 10% by total volume of the stabilized hematoxylin formulation, and wherein the stabilized hematoxylin formulation has a pH of less than 2.4; and
the second component comprising a strong base or a buffer, the second component provided in an amount relative to the first component such that when the first and second components are mixed, the pH of the hematoxylin solution increases to greater than 2.4.

Additional Embldiment (21) The kit of additional embodiment 13, wherein the second component is provided in an amount relative to the first component such that when the first and second components are mixed, the pH of the hematoxylin solution increases to greater than 2.5.

Additional Embldiment (22) The kit of additional embodiment 13, wherein the second component is provided in an amount relative to the first component such that when the first and second components are mixed, the pH of the hematoxylin solution ranges from between about 2.45 to about 2.54.

Additional Embldiment (23) The kit of additional embodiment 13, wherein the second component is provided in an amount relative to the first component such that when the first and second components are mixed, the pH of the hematoxylin solution ranges from between about 2.5 to about 2.6.

Additional Embldiment (24) The kit of any of additional embodiments 13 to 23, wherein the first component further comprises a mordant, and an oxidant.

Additional Embldiment (25) The kit of any of additional embodiments 20 to 14, wherein the first component further comprises a shelf-life extending agent.

Additional Embldiment (26) The kit of additional embodiment 15, wherein the shelf-life extending agent is a polyol.

Additional Embldiment (27) The kit of additional embodiment 16, wherein the polyol is selected from the group consisting of propylene glycol, ethylene glycol, and mixtures thereof.

Additional Embldiment (28) The kit of additional embodiment 13, wherein the stabilized hematoxylin formulation consists essentially of hematoxylin dye, a mordant, an oxidant, and the acid.

Additional Embldiment (29) The kit of any of additional embodiments 13 to 25, wherein the second component comprises a strong base selected from the group consisting of sodium hydroxide, potassium hydroxide and lithium hydroxide.

Additional Embldiment (30) The kit of any of additional embodiments 13 to 25, wherein the second component comprises a buffer selected from the group consisting of a cyanoacetate, fumarate, and sulfate.

Additional Embldiment (31) The kit of any of additional embodiments 13 to 25, further comprising a third component, the third component comprising a counterstain.

Additional Embldiment (32) The kit of additional embodiment 20, wherein the counterstain selected from the group consisting of eosin Y, orange G, light green SF yellowish, Bismark Brown, and fast green FCF.

Additional Embldiment (33) A method of staining a biological sample, comprising mixing the first component of any of additional embodiments 13 to 30 and the second component of any of additional embodiments 13 to 30 to form a hematoxylin staining solution, and contacting the biological sample with the formed hematoxylin staining solution.

Additional Embldiment (34) The method of additional embodiment 33, wherein a ratio of the first component to the second component in the hematoxylin staining solution ranges from 5:1 to about 25:1.

Additional Embldiment (35) The method of additional embodiment 34, the ratio ranges from about 10:1 to about 20:1.

Additional Embldiment (36) The method of any of additional embodiments 33-35, wherein the first and second components are mixed for at least 10 seconds prior to contacting with the biological sample.

Additional Embldiment (37) The method of any of additional embodiments 33 to 35, wherein the first and second components are applied to the biological sample as separate components and mixed in the presence of the biological sample to form the hematoxylin formulation.

Additional Embldiment (38) The method of additional embodiment 37, wherein the first and second components are applied to simultaneously.

Additional Embldiment (39) The method of additional embodiment 37, wherein the first and second components are applied to sequentially Additional Embldiment (40) The method of additional embodiment39, the second component is applied before the first component is applied.

Additional Embldiment (41) A dispenser comprising the stabilized hematoxylin formulation of additional embodiment 1.

Additional Embldiment (42) A kit comprising the dispenser of additional embodiment 41, and a second dispenser comprising one of a strong base or a buffer.

Additional Embldiment (43) The kit of additional embodiment 42, further comprising a third dispenser having a counterstain.

Additional Embldiment (44) A system for staining a biological sample mounted on a substrate comprising:
a first container comprising a stabilized hematoxylin formulation comprising hematoxylin dye and an acid in an amount ranging from about 0.1% to about 10% by total volume of the stabilized hematoxylin formulation, and wherein the stabilized hematoxylin formulation has a pH of less than 2.4;
a second container comprising a readjustment solution, the first and second containers fluidically connected to a mixing receptacle such that the stabilized hematoxylin formulation and the readjustment solution can be combined to provide a hematoxylin staining solution.

Additional Embldiment (45) The system of additional embodiment 44, further comprising a substrate holder for holding the biological sample mounted on the substrate, the substrate holder being in fluidic communication with the mixing receptacle such that the hematoxylin staining solution can be applied to the biological sample.

Additional Embldiment (46) A stabilized hematoxylin formulation comprising hematoxylin dye, a salt formed from the reaction of a base with an acid, wherein the pH of the stabilized hematoxylin formulation ranges from about 2.4 to about 2.6.

Additional Embldiment (47) The stabilized hematoxylin formulation of additional embodiment 46, wherein the strong base is selected from the group consisting of sodium hydroxide, potassium hydroxide and lithium hydroxide; and wherein the acid is selected from the group consist of hydrochloric acid and sulfuric acid.

Additional Embldiment (48) The hematoxylin formulation of any of additional embodiments 46 to 47, further comprising a mordant and an oxidant.

Additional Embldiment (49) The hematoxylin formulation of any of additional embodiments 46 to 48, further comprising a shelf-life extending agent.

Additional Embldiment (50) The hematoxylin formulation of additional embodiment 46, wherein the stabilized hematoxylin formulation consists essentially of the hematoxylin dye, the mordant, the oxidant, and the salt from the reaction product of the acid with the base.

Additional Embldiment (51) The hematoxylin formulation of additional embodiment 50, wherein the oxidant is sodium iodate and wherein the mordant comprises aluminum.

Additional Embldiment (52) A method of staining a biological sample, comprising contacting the biological sample with the stabilized hematoxylin formulation of any of additional embodiments 46 to 51.

Additional Embldiment (53) The method of additional embodiment 52, further comprising contacting the sample with a counterstain selected from the group consisting of eosin Y, orange G, light green SF yellowish, Bismark Brown, and fast green FCF.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A method of staining a biological sample comprising:
(a) providing a first reservoir comprising a stabilized hematoxylin formulation having a pH of less than 2.4, wherein the stabilized hematoxylin formulation comprises a hematoxylin dye and an acid in an amount ranging from 0.2% to 4% by total volume of the stabilized hematoxylin formulation;
(b) mixing an aliquot of the stabilized hematoxylin formulation from the first reservoir with a base to increase the pH of the aliquot of the obtained stabilized hematoxylin formulation to form a hematoxylin staining solution having a pH ranging from 2.4 to 2.6, wherein the base is provided in a second reservoir, and wherein the hematoxylin staining solution is formed in a third reservoir; and (c) after forming the hematoxylin staining solution having the pH ranging from 2.4 to 2.6 in the third reservoir, dispensing with an automated staining apparatus the formed hematoxylin staining solution having the pH ranging from 2.4 to 2.6 to the biological sample.

2. The method of claim 1, wherein the pH of the stabilized hematoxylin formulation is less than 2.3.

3. The method of claim 1, wherein the pH of the stabilized hematoxylin formulation is less than 2.2.

4. The method of claim 1, wherein the base comprises a strong base.

5. The method of claim 4, wherein the strong base is selected from the group consisting of sodium hydroxide, potassium hydroxide, lithium hydroxide, and ammonia.

6. The method of claim 1, wherein the composition further comprises a buffer having a pKa ranging from 1.5 to 3.5.

7. The method of claim 1, wherein the aliquot of the obtained stabilized hematoxylin formulation is further mixed with an additive selected from the group consisting of a shelf-life extending agent, an oxidant, and a mordant.

8. The method of claim 1, wherein the acid of the stabilized hematoxylin formulation is selected from the group consisting of hydrochloric acid, sulfuric acid, perchloric acid and nitric acid.

9. The method of claim 1, wherein the stabilized hematoxylin formulation further comprises a mordant, and an oxidant.

10. The method of claim 1, wherein the stabilized hematoxylin formulation further comprises a shelf-life extending agent.

11. The method of claim 10, wherein the shelf-life extending agent is a polyol.

12. The method of claim 11, wherein the polyol is selected from the group consisting of propylene glycol, ethylene glycol, and mixtures thereof.

13. The method of claim 1, wherein the stabilized hematoxylin formulation consists essentially of hematoxylin dye, a mordant, an oxidant, and the acid.

14. A method of staining a biological sample, comprising:
(a) dispensing to the biological sample with an automated staining apparatus a stabilized hematoxylin formulation comprising a hematoxylin dye and an acid in an amount ranging from 0.1% to 10% by total volume of the stabilized hematoxylin formulation, wherein the stabilized hematoxylin formulation has a pH of less than 2.4; (b) simultaneous or subsequent to the dispensing of the stabilized hematoxylin formulation to the biological sample, dispensing to the biological sample with an automated staining apparatus a readjustment solution, wherein the readjustment solution comprises a strong base; (c) permitting the stabilized hematoxylin formulation and the readjustment solution to form a hematoxylin staining solution having a pH ranging from 2.4 to 2.6 while in contact with the biological sample.

15. The method of claim 14, wherein a ratio of the stabilized hematoxylin formulation to the readjustment solution in the formed hematoxylin staining solution ranges from 5:1 to 25:1.

16. The method of claim 15, wherein the ratio ranges from 10:1 to 20:1.

17. A method of staining a biological sample, comprising:
(a) introducing a stabilized hematoxylin formulation having a pH of less than 2.4 to a container of an automated staining system; (b) introducing a readjustment solution to the container of the automated staining system, wherein the readjustment solution comprises a strong base; (c) permitting, in the container of the automated staining system, the stabilized hematoxylin formulation and the readjustment solution to form a hematoxylin staining solution having a pH ranging from 2.4 to 2.6; and (d) dispensing the formed hematoxylin staining solution from the container of the automated staining apparatus to the biological sample.

* * * * *